March 13, 1962     A. C. MOSELY     3,025,086

COMPRESSION PIPE FITTINGS

Filed Feb. 25, 1958

INVENTOR
ARTHUR COLIN MOSELY

By: Norris & Bateman
Attorneys

COMPRESSION PIPE FITTINGS

Arthur Colin Mosely, Bacons End, near Coleshill, England, assignor to Compression Joints Limited, Birmingham, England, a British company
Filed Feb. 25, 1958, Ser. No. 717,354
2 Claims. (Cl. 285—250)

This invention has reference to improvements in or relating to compression pipe fittings which are primarily intended for application to plastic pipes or tubes made say from polythene and intended for use in connection with liquids.

The object of the present invention is to provide an improved pipe fitting which facilitates the assembly and efficacy of the pipe joint or coupling.

The invention consists of a compression type pipe fitting for attachment to a plastic pipe comprising a first rigid fitting member having an inclined annular axially directed internal face, a ferrule having an enlarged rigid head and a shank portion coaxial with said head, said head having at one end an inclined annular axially directed face adapted to abut said internal face, said shank having concentric spaced apart skirts forming an axially open annular cup which is adapted to receive the end of a plastic pipe, a second rigid fitting member axially threadedly engaged with said first fitting member and surrounding at least the shank of said ferrule, and an internal inclined annular compression face on said second rigid fitting member adapted to engage said ferrule to radially deform the outer skirt of said annular cup into gripping engagement with the plastic pipe in said cup and tightly urge together said axially directed faces on the ferrule and first fitting member when said fitting members are threadedly engaged to move them toward each other, and means for axially rigidly clamping said ferrule between said fitting members independently of the deformation of said cup and limiting the maximum relative axial engagement of said fitting members to a predetermined magnitude.

Figure 1:
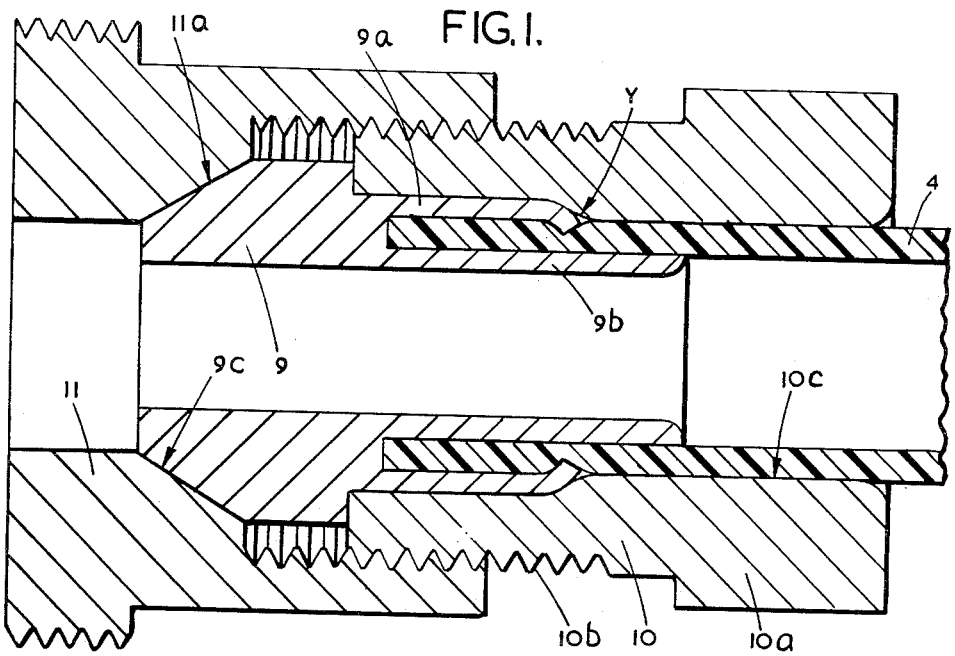
Figure 2:
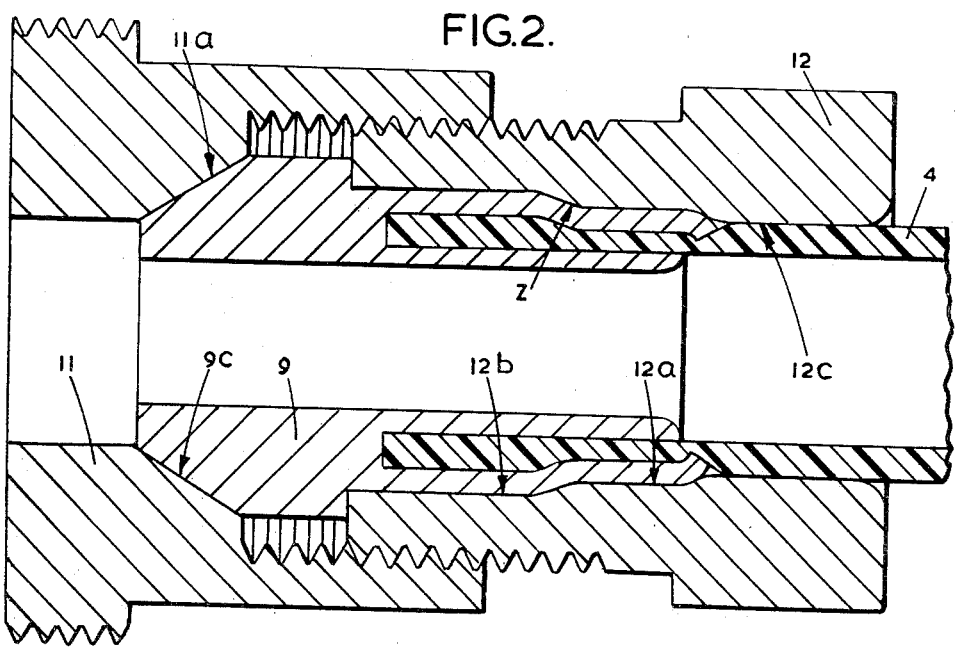

Means for carrying the invention into practice will now be described with reference to the accompanying drawings wherein:

FIGURE 1 is a longitudinal section of a compression pipe fitting according to a preferred embodiment of the invention, and FIGURE 2 illustrates in section a further embodiment of the invention having a modified form of the nut or male element different from that of FIGURE 2.

In FIGURE 1, the ferrule comprises a pair of concentric cylindrical walls 9a, 9b projecting from the base of a frusto-conical head 9c, the cup obtaining between the pair of concentric walls 9a and 9b being adapted for the accommodation of an end of the plastic pipe or tube 4. The aforesaid ferrule is employed in conjunction with a plug-like male fitting element 10 having an hexagonal nut like extremity 10a and a screw threaded external peripheral part 10b to admit of the screwed connection of this element into a female fitting element 11, it being understood that the female element may in certain cases be formed as an integral part of a device, such as for example a carburetor or petrol pump, to which the plastic pipe is to be connected. The male element 10 is provided with an axial bore the smallest diameter 10c whereof is arranged to snugly fit about the periphery of the pipe which is directed through the bore so as to provide a support for the pipe. The inner end of the bore, i.e. the end adjacent to the female element 11 is of enlarged diameter for the reception therein of the outer wall 9a of the cupped part of the ferrule 9 which is mounted on the end of the pipe, and in order to effect the embedment of part of the skirt or outer wall of the cupped part of the ferrule into the periphery of the pipe 4 the bore of the male element 10 is formed with a compression face constituted by an incline faced step or shoulder Y which is adapted to bear upon the rim of the outer wall 9a of the ferrule as the male element 10 is screwed into the female element 11 of the fitting.

In the conventional type of compression fitting the degree of compression of the skirt of the ferrule or equivalent part is determined by the degree of tightening of the fitting parts which is effected by the operator. This often disadvantageous feature may be avoided n the above described fitting by the formation as shown in FIGURE 2 of a part of the bore of the male element 12 with a diameter 12a intermediate between that of the smaller and larger bore diameters 12b and 12c, this intermediate part 12a being formed immediately behind the said compressive face or shoulder at Z. By this means the continued tightening of the male element 12 relative to an associated female element will not effect an increasing depth of penetration of the rim of the ferrule into the periphery of the pipe beyond a predetermined limit after the compressive face has been displaced over the rim of the outer wall of the ferrule.

The female element 11 is formed with a frusto-conical mouth 11a for the reception of the frusto-conical head 9c of the ferrule. In use the male member 10 is screwed into the female part of the fitting until the frusto-conical ferrule head 9c is gripped between the frusto-conical mouth 11a of the female element and the forward end of the male element 10 of the fitting. Thus the depth of embedment of the outer wall of the ferrule into the pipe can be controlled by the permitted distance of travel of the forward end of the male element relative to the radial face of the head 9c of the ferrule after the compression face of the male element has engaged the outer wall of the ferrule. Further it will be seen that a tight seal is obtained between the periphery of the ferrule and the associated parts of the fitting independent of the compressed or embedded part of the ferrule.

If desired the outer wall of the cup part of the ferrule may be embedded into the periphery of the pipe in two or more diametral planes by the provision of a step or steps in the periphery of the outer wall of the cupped part which co-acts or co-act with a further compression face or faces provided in the bore of the male fitting element. Alternatively the outer wall of the ferrule may be compressed in a single plane remote from the rim of the ferrule.

I claim:

1. A compression type pipe fitting comprising a first rigid fitting member having an inclined annular axially directed internal face, a ferrule having an enlarged rigid head and a shank portion coaxial with said head, said head having at one end an inclined annular axially directed face adapted to abut said internal face, said shank having concentric spaced apart skirts forming an axially open annular cup which is adapted to receive the end of a plastic pipe, a second rigid fitting member axially threadedly engaged with said first fitting member and surrounding at least the shank of said ferrule, and an internal inclined annular compression face on said second rigid fitting member adapted to engage said ferrule to radially deform the outer skirt of said annular cup into gripping engagement with the plastic pipe in said cup and tightly urge together said axially directed faces on the ferrule and first fitting member when said fitting members are threadedly engaged to move them toward each other, and means for axially rigidly clamping said ferrule between said fitting members independently of the deformation of said cup and limiting the maximum relative axial engagement of said fitting members to a predetermined magnitude.

2. The fitting as defined in claim 1 wherein said means for axially rigidly clamping said ferrule comprises a first exposed annular axially extending abutment surface axially opposed to said inclined annular axially directed face and formed on said ferrule adjacent said outer skirt, and a second annular axially extending exposed abutment surface formed on said other fitting member and facing said first abutment surface in coaxial relationship therewith so that said abutment surfaces engage each other after predetermined relative rotation of said members.

References Cited in the file of this patent

UNITED STATES PATENTS

| | | |
|---|---|---|
| 928,237 | Baird | July 20, 1909 |
| 1,862,833 | Stover | June 14, 1932 |
| 2,211,147 | Miller | Aug. 13, 1940 |
| 2,230,115 | Kreidel | Jan. 28, 1941 |
| 2,365,747 | Cowles | Dec. 26, 1944 |
| 2,470,546 | Carlson | May 17, 1949 |
| 2,613,959 | Richardson | Oct. 14, 1952 |
| 2,693,374 | Wurzburger | Nov. 2, 1954 |
| 2,782,060 | Appleton | Feb. 19, 1957 |
| 2,797,111 | Beagley | June 25, 1957 |

FOREIGN PATENTS

| | | |
|---|---|---|
| 519,641 | Great Britain | Apr. 2, 1940 |
| 363,212 | Italy | Sept. 22, 1938 |
| 102,847 | Great Britain | Jan. 4, 1917 |